United States Patent
Tanaka et al.

(10) Patent No.: US 7,601,325 B2
(45) Date of Patent: Oct. 13, 2009

(54) PEROVSKITE-TYPE COMPOSITE OXIDE, CATALYST COMPOSITION AND METHOD FOR PRODUCING PEROVSKITE-TYPE COMPOSITE OXIDE

(75) Inventors: Hirohisa Tanaka, Shiga (JP); Isao Tan, Shiga (JP); Mari Uenishi, Shiga (JP); Nobuhiko Kajita, Shiga (JP); Masashi Taniguchi, Shiga (JP); Kimiyoshi Kaneko, Kanagawa (JP); Senshu Mitachi, Kanagawa (JP); Mareo Kimura, Shizuoka (JP); Keiichi Narita, Shizuoka (JP); Noboru Sato, Shizuoka (JP)

(73) Assignees: Daihatsu Motor Co., Ltd., Osaka (JP); Hokko Chemical Industry Co., Ltd., Tokyo (JP); Cataler Corporation, Shizuoka (JP)

( * ) Notice: Subject to any disclaimer, the term of this patent is extended or adjusted under 35 U.S.C. 154(b) by 293 days.

(21) Appl. No.: 10/593,827

(22) PCT Filed: Mar. 18, 2005

(86) PCT No.: PCT/JP2005/005599

§ 371 (c)(1),
(2), (4) Date: Sep. 22, 2006

(87) PCT Pub. No.: WO2005/090238

PCT Pub. Date: Sep. 29, 2005

(65) Prior Publication Data

US 2007/0213208 A1  Sep. 13, 2007

(30) Foreign Application Priority Data

Mar. 22, 2004  (JP) ............................. 2004-081935

(51) Int. Cl.
- C01G 55/00 (2006.01)
- C01G 1/00 (2006.01)
- C01F 17/00 (2006.01)
- B01J 23/10 (2006.01)
- B01J 23/44 (2006.01)

(52) U.S. Cl. ................ 423/593.1; 423/594.1; 423/263; 502/302; 502/325

(58) Field of Classification Search .............. 423/592.1, 423/593.4, 594.1, 263, 593.1; 502/302, 325
See application file for complete search history.

(56) References Cited

U.S. PATENT DOCUMENTS 5,447,705 A * 9/1995 Petit et al. ................. 423/418.2
5,622,680 A    4/1997 Monceaux et al.
7,381,394 B2 * 6/2008 Tanaka et al. ............. 423/593.1
2005/0249653 A1  11/2005 Tanaka et al.

FOREIGN PATENT DOCUMENTS

| EP | 0 525 677 A1 | 2/1993 |
|---|---|---|
| EP | 1 533 274 A1 | 5/2005 |
| EP | 1 535 662 A1 | 6/2005 |
| EP | 1 535 663 A1 | 6/2005 |
| EP | 1 859 862 A1 | 11/2007 |
| EP | 1 860 085 A1 | 11/2007 |
| JP | H06-100319 | 4/1994 |
| JP | H08-217461 | 8/1996 |
| JP | 2004-43217 | 2/2004 |
| WO | WO 2004/005194 | * 1/2004 |

OTHER PUBLICATIONS

Nolven Guilhaume, Stefan D. Peter, Michel Primet, "Palladium-substituted lanthanum cuprates: application to automotive exhaust purification," Applied Catalysis B: Environmental 10 (1996), pp. 325-344.*

Nolven Guilhaume, Stefan D. Peter, Michel Primet, "Palladium-substituted lanthanum cuprates: application to automotive exhaust purification" Applied Catalysis B: Environmental 10 (1996), pp. 325-344.*

Y. Nishihata et al., "Self-regeneration of a Pd-perovskite catalyst for automotive emission control", Nature, Jul. 11, 2002, vol. 418(6894), Nature Publishing Group, Japan.

Martin D. Smith, et al., "Palladium-containing perovskites: recoverable and reuseable catalysts for Suzuki couplings," Chemical Communications-Chemcom, Nov. 7, 2003, pp. 2652-2653, Royal Society of Chemistry, Great Britain.

Isao Tan, et al., "Structural Stability of Pd-Perovskite Catalysts after Heat Treatment Under Redox Condition," Journal of Ceramic Society of Japan, Jan. 1, 2005, pp. 71-76. vol. 113, No. 1313, Japan.

* cited by examiner

*Primary Examiner*—Ngoc-Yen M Nguyen
*Assistant Examiner*—Diana J Liao
(74) *Attorney, Agent, or Firm*—Jean C. Edwards, Esq.; Akerman Senterfitt

(57) ABSTRACT

To provide a perovskite-type composite oxide which has stable quality in which a solid solution of Pd is formed at a high rate, a method for producing the perovskite-type composite oxide, and a catalyst composition containing the perovskite-type composite oxide, the perovskite-type composite oxide is produced by formulating materials in accordance with each atomic ratio of a perovskite-type composite oxide represented by the following general formula (1):

$$A_x B_{(1-y)} Pd_y O_{3+\delta} \qquad (1)$$

wherein A represents at least one element selected from rare earth elements and alkaline earth metals; B represents at least one element selected from transition elements (excluding rare earth elements, and Pd), Al and Si; x represents an atomic ratio satisfying the following condition: $1 < x$; y represents an atomic ratio satisfying the following condition: $0 < y \leq 0.5$; and $\delta$ represents an oxygen excess.

6 Claims, No Drawings

PEROVSKITE-TYPE COMPOSITE OXIDE, CATALYST COMPOSITION AND METHOD FOR PRODUCING PEROVSKITE-TYPE COMPOSITE OXIDE

CROSS-REFERENCE TO RELATED APPLICATIONS

The present application is a 35 U.S.C. 371 national stage entry of International Patent Application No. PCT/JP2005/005599, filed Mar. 18, 2005, which claims priority from Japanese Patent Application No. JP 2004-081935, filed Mar 22, 2004, the contents of which are herein incorporated by reference in their entirety.

TECHNICAL FIELD

The present invention relates to a perovskite-type composite oxide, a catalyst composition and a method for producing a perovskite-type composite oxide. More particularly, it relates to a perovskite-type composite oxide and a catalyst composition containing the perovskite-type composite oxide, and a method for producing the perovskite-type composite oxide.

BACKGROUND ART

Perovskite-type composite oxides are composite oxides having a crystal structure of a general formula $ABO_3$ and have been widely used as a ceramic material in various industrial fields.

Of these perovskite-type composite oxides, a perovskite-type composite oxide of a general formula $AB_{(1-y)}Pd_yO_3$ (y represents an atomic ratio of Pd, the same shall apply hereinafter), in which palladium (Pd) is coordinated on the B site in the crystal structure of the general formula $ABO_3$, shows high catalytic activity as an exhaust gas purifying catalyst (three-way catalyst) that can simultaneously clean up carbon monoxide (CO), hydrocarbons (HC) and nitrogen oxides (NOx) contained in emissions from internal combustion engines.

Reportedly, as such an exhaust gas purifying catalyst, for example, a perovskite-type composite of $La_{1.00}Fe_{0.57}Co_{0.38}Pd_{0.05}O_3$ suppresses grain growth and maintains high catalytic activity over a long time. This is because of a self-regenerative function, in which the perovskite-type composite oxide reversely introduces or extracts Pd to or from a perovskite-type crystal structure corresponding to oxidation-reduction change of emissions. (See Y. Nishihata et al., Nature, Vol. 418, No. 6894, pp. 164-167, 11 Jul. 2002.)

However, in order to achieve self-regenerative function of Pd of the general formula $AB_{(1-y)}Pd_yO_3$, it is necessary to form a solid solution of Pd at a high rate in the perovskite-type composite oxide.

On the other hand, even when materials are formulated in the very same amount during the production of the perovskite-type composite oxide of the general formula $AB_{(1-y)}Pd_yO_3$, there may arise unstable quality in which a solid solution of Pd is sometimes formed at a lower rate. Therefore, it is acutely required to produce a perovskite-type composite oxide in which a solid solution of Pd is formed stably at a high rate.

DISCLOSURE OF THE INVENTION

An object of the present invention is to provide a perovskite-type composite oxide which has stable quality and in which a solid solution of Pd is formed at a high rate, and a method for producing the perovskite-type composite oxide, and a catalyst composition containing the perovskite-type composite oxide.

The perovskite-type composite oxide of the present invention is represented by the following general formula (1):

$$A_xB_{(1-y)}Pd_yO_{3+\delta} \quad (1)$$

wherein A represents at least one element selected from rare earth elements and alkaline earth metals; B represents at least one element selected from transition elements (excluding rare earth elements, and Pd), Al and Si; x represents an atomic ratio satisfying the following condition: $1<x$; y represents an atomic ratio satisfying the following condition: $0<y\leq0.5$; and δ represents an oxygen excess.

The perovskite-type composite oxide of the present invention is represented by the following general formula (2):

$$(A_aA'_bA''_c)(B_{1-(q+r)}B'_qPd_r)O_{3+\delta} \quad (2)$$

wherein A represents at least one element selected from La, Nd and Y; A' represents at least one element selected from rare earth elements and alkaline earth metals (excluding La, Nd, Y, Ce, Pr and Tb); A'' represents at least one element selected from Ce, Pr and Tb; B represents at least one element selected from Mn, Fe, Co and Al; B' represents at least one element selected from transition elements (excluding rare earth elements, and Mn, Fe, Co, Al and Pd) and Si; a represents an atomic ratio satisfying the following condition: $0.5<a\leq1.3$; b represents an atomic ratio satisfying the following condition: $0\leq b<0.5$; (a+b) represent atomic ratios satisfying the following condition: $1<(a+b)\leq1.3$; c represents an atomic ratio satisfying the following condition: $0\leq c\leq0.2$; q represents an atomic ratio satisfying the following condition: $0\leq q\leq0.5$; r represents an atomic ratio satisfying the following condition: $0<r\leq0.5$; and δ represents an oxygen excess.

It is preferred that at least one of b, c and q is 0 in the general formula (2).

Also the present invention includes a catalyst composition comprising the above-described perovskite-type composite oxide. The catalyst composition is advantageously used as an exhaust gas purifying catalyst. Also the catalyst composition is advantageously used as a coupling reaction catalyst for organic synthesis.

Also the present invention includes a method for producing a perovskite-type composite oxide, which comprises the step of formulating materials in accordance with each atomic ratio of a perovskite-type composite oxide represented by the following general formula (1):

$$A_xB_{(1-y)}Pd_yO_{3+\delta} \quad (1)$$

wherein A represents at least one element selected from rare earth elements and alkaline earth metals; B represents at least one element selected from transition elements (excluding rare earth elements, and Pd), Al and Si; x represents an atomic ratio satisfying the following condition: $1<x$; y represents an atomic ratio satisfying the following condition: $0<y\leq0.5$; and δ represents an oxygen excess.

According to the production method of the perovskite-type composite oxide of the present invention, since a material is formulated so that the atomic ratio of the elements to be coordinated on the A site exceeds 1, it is possible to form a solid solution of Pd stably at a high rate. Therefore, it is possible to stably produce a perovskite-type composite oxide in which a solid solution of Pd is formed at a high rate. According to the production method of the perovskite-type composite oxide of the present invention, even when a material containing the constituent element on the site A is lost during the production, the materials are formulated so that the atomic ratio of the elements to be coordinated on the A site exceeds 1, it is possible to suppress that the atomic ratio on the A site is smaller than the atomic ratio on the B site. Therefore, it is possible to stably produce a perovskite-type composite oxide in which a solid solution of Pd is formed at a high rate.

With respect to the perovskite-type composite oxide of the present invention, it is possible to provide a perovskite-type composite oxide which has stable quality and in which a solid solution of Pd is formed at a high rate.

Since the catalyst composition of the present invention contains the perovskite-type composite oxide having stable quality, stable self-regenerative function of Pd can be secured and excellent catalytic activity can be maintained for a long period.

PREFERRED EMBODIMENT FOR CARRYING OUT THE INVENTION

The perovskite-type composite oxide of the present invention is represented by the following general formula (1):

$$A_x B_{(1-y)} Pd_y O_{3+\delta} \qquad (1)$$

wherein A represents at least one element selected from rare earth elements and alkaline earth metals; B represents at least one element selected from transition elements (excluding rare earth elements, and Pd), Al and Si; x represents an atomic ratio satisfying the following condition: $1<x$; y represents an atomic ratio satisfying the following condition: $0<y\leq 0.5$; and $\delta$ represents an oxygen excess.

In the general formula (1) of the perovskite-type composite oxide represented of the present invention, constituent elements of A are coordinated on the A site, while constituent elements of B and Pd are coordinated on the B site.

Examples of the rare earth element represented by A in the general formula (1) are Sc (scandium), Y (yttrium), La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Er (erbium), Tm (thulium), Yb (ytterbium) and Lu (lutetium), of which Y, La, Nd, Ce, Pr and Tb are preferred, and Y, La and Nd are more preferred.

Each of these rare earth elements can be used alone or in combination.

Examples of the alkaline earth metal represented by A in the general formula (1) are Be (beryllium), Mg (magnesium), Ca (calcium), Sr (strontium), Ba (barium) and Ra (radium).

Each of these alkaline earth metals can be used alone or in combination.

In the general formula (1), it is preferred to use, as A, an alkaline earth metal in an atomic ratio of 0.5 or less with respect to rare earth elements.

The element to be coordinated on the A site in the perovskite-type composite oxide of the present invention is preferably selected from rare earth elements. The atomic ratio x of the element (rare earth elements and/or alkaline earth elements) to be coordinated on the A site satisfies the following condition: $1<x$, namely, the atomic ratio exceeds 1.00. When the atomic ratio x is 1.00 or less, it is difficult to form a solid solution of Pd stably at a high rate. The atomic ratio x preferably satisfies the following condition: $1.00<x\leq 1.50$; and more preferably satisfies the following condition: $1.00<x\leq 1.30$.

The transition elements (excluding rare earth elements and Pd) represented by B in the general formula (1) are, in the Periodic Table of Elements (IUPAC, 1990), elements (excluding Pd) having atomic numbers of 22 (Ti) through 30 (Zn), atomic numbers of 40 (Zr) through 48 (Cd), and atomic numbers of 72 (Hf) through 80 (Hg).

In the perovskite-type composite oxide of the present invention, the elements to be coordinated on the B site include Pd as an essential element and are preferably selected from Cr (chromium), Mn (manganese), Fe (iron), Co (cobalt), Ni (nickel), Cu (copper), Zn (zinc) and Al (aluminum), and are more preferably selected from Mn, Fe, Co and Al.

The atomic ratio y of Pd to be coordinated on the B site satisfies the following condition: $0<y\leq 0.5$, namely, y is 0.5 or less. When the atomic ratio of Pd exceeds 0.5, it may be difficult to form a solid solution of Pd and also the cost inevitably increases.

Therefore, elements other than Pd [elements selected from transition elements (excluding rare earth elements and Pd), Al and Si] are contained on the B site at an atomic ratio (1-y) as the residue of the atomic ratio of Pd.

'$\delta$' represents an oxygen excess. More specifically, it represents an excessive atomic ratio of oxygen atom caused by allowing the constitutional elements of the A site to be excessive to the stoichiometric ratio of a perovskite-type composite oxide of A:B:O=1:1:3.

Accordingly, the perovskite-type composite oxide of the present invention is preferably represented by the following general formula (2):

$$(A_a A'_b A''_c)(B_{1-(q+r)} B'_q Pd_r) O_{3+\delta} \qquad (2)$$

wherein A represents at least one element selected from La, Nd and Y; A' represents at least one element selected from rare earth elements and alkaline earth metals (excluding La, Nd, Y, Ce, Pr and Tb); A'' represents at least one element selected from Ce, Pr and Tb; B represents at least one element selected from Mn, Fe, Co and Al; B' represents at least one element selected from transition elements (excluding rare earth elements, Mn, Fe, Co, Al and Pd) and Si; a represents an atomic ratio satisfying the following condition: $0.5<a\leq 1.3$; b represents an atomic ratio satisfying the following condition: $0\leq b<0.5$; (a+b) represent atomic ratios satisfying the following condition: $1<(a+b)\leq 1.3$; c represents an atomic ratio satisfying the following condition: $0\leq c\leq 0.2$; q represents an atomic ratio satisfying the following condition: $0\leq q<0.5$; r represents an atomic ratio satisfying the following condition: $0<r\leq 0.5$; and $\delta$ represents an oxygen excess.

In the general formulas (2), $(A_a A'_b A''_c)$ is coordinated on the A site and $(B_{1-(q+r)} B'_q Pd_r)$ is coordinated on the B site.

The rare earth elements, alkaline earth elements and transition elements can be the same elements as listed above.

In the perovskite-type composite oxide represented by the general formula (2), in $(A_a A'_b A''_c)$, a represents an atomic ratio of A satisfying the following condition: $0.5<a\leq 1.3$; b represents an atomic ratio of A' satisfying the following condition: $0\leq b<0.5$; c represents an atomic ratio of A'' satisfying the following condition: $0\leq c\leq 0.2$; and (a+b) represent atomic ratios satisfying the following condition: $1<(a+b)\leq 1.3$. Therefore, the atomic ratio z as $(A_a A'_b A''_c)$ always exceeds 1.00 and satisfies the following condition: $1<z\leq 1.5$.

When the atomic ratio of $(A_a A'_b A''_c)$ is 1.00 or less, it is impossible to form a solid solution of Pd stably at a high rate, as described above. When (a+b) exceeds 1.3, byproducts other than the perovskite-type composite oxides may be formed.

'z' preferably satisfies the following condition: $1.00<z\leq 1.50$, and more preferably satisfies the following condition: $1.00<z\leq 1.30$.

In the perovskite-type composite oxide represented by the general formula (2), in $(B_{1-(q+r)}B'_qPd_r)$, r represents the atomic ratio of Pd satisfying the following conditions: $0<r\leqq0.5$ and q represents the atomic ratio of B' satisfying the following conditions: $0\leqq q<0.5$. Therefore, B is contained at an atomic ratio [1-(q+r)] as the residue of the atomic ratio of Pd and B'.

'δ' is as defined above.

In the general formula (2), preferably at least one of b, c and q is 0 and more preferably all of b, c and q are 0.

The above-mentioned perovskite-type composite oxide can be prepared by any suitable process for preparing composite oxides, such as a coprecipitation process, a citrate complex process, or an alkoxide process.

According to the coprecipitation process, the perovskite-type composite oxide can be prepared, for example, in the following manner. Initially, an aqueous mixed salt solution containing salts (materials) of the respective elements is prepared so as to establish the above-mentioned stoichiometric ratio of the respective elements. The aqueous mixed salt solution is coprecipitated by adding a neutralizing agent thereto, the resulting coprecipitate is dried and then subjected to a heat treatment.

Examples of the salts of the respective elements are inorganic salts such as sulfates, nitrates, chlorides, and phosphates; and organic acid salts such as acetates and oxalates. The aqueous mixed salt solution can be prepared, for example, by adding the salts of the elements to water so as to establish the stoichiometric ratio and mixing them with stirring.

Then, the aqueous mixed salt solution is coprecipitated by adding a neutralizing agent thereto. Examples of the neutralizing agent are ammonia; organic bases including amines such as triethylamine and pyridine; and inorganic bases such as sodium hydroxide, potassium hydroxide, potassium carbonate, and ammonium carbonate. The neutralizing agent is added to the aqueous mixed salt solution so that the resulting solution has a pH of about 6 to about 10.

A perovskite-type composite oxide can be prepared by optionally washing, drying, for example, by vacuum drying or forced-air drying, and heat-treating at, for example, about 500° C. to 1000° C., preferably at about 600° C. to 950° C., the obtained coprecipitate.

According to the citrate complex process, the perovskite-type composite oxide is prepared, for example, in the following manner. Initially, an aqueous citrate-mixed salt solution containing citric acid and salts (materials) of the respective elements is prepared so as to establish the above-mentioned stoichiometric ratio of the respective elements. The aqueous citrate-mixed salt solution is evaporated to dryness to form citrate complexes of the respective elements. The citrate complexes are provisionally baked and subjected to a heat treatment.

The salts of the respective elements can be the same salts as listed above. The aqueous citrate-mixed salt solution can be prepared by preparing an aqueous mixed salt solution by the same procedure of the coprecipitation process and adding an aqueous solution of citric acid to the aqueous mixed salt solution.

The aqueous citrate-mixed salt solution is then evaporated to dryness to form citrate complexes of the respective elements. The evaporation to dryness is carried out to remove fluids rapidly at a temperature at which the formed citrate complexes are not decomposed, for example, at room temperature to about 150° C. Consequently, the above-mentioned citrate complexes of the respective elements can be formed.

The citrate complexes thus formed are provisionally baked and subjected to a heat treatment.

Provisionally baking may be carried out by heating at 250° C. or higher in vacuo or in an inert atmosphere. Then, the citrate complexes are subjected to a heat treatment at, for example, about 300° C. to 1000° C., and preferably about 600° C. to 950° C., to prepare a perovskite-type composite oxide.

According to the alkoxide process, the perovskite-type composite oxide can be prepared, for example, in the following manner. A mixed alkoxide solution containing alkoxides (materials) of the respective elements excluding noble metals including Pd is prepared so as to establish the stoichiometric ratio of the respective elements. The mixed alkoxide solution is precipitated on hydrolysis by adding an aqueous solution containing salts (materials) of noble metals including Pd, and the resulting precipitate is dried and heat-treated.

Examples of the alkoxides of the respective elements are alcholates each comprising the respective elements and an alkoxy such as methoxy, ethoxy, propoxy, isopropoxy or butoxy; and alkoxyalcholates of the respective elements represented by the following general formula (3):

$$E[OCH(R^1)-(CH_2)_i-OR^2]_j \quad (3)$$

wherein E represents the respective element; $R^1$ represents a hydrogen atom or an alkyl group having 1 to 4 carbon atoms; $R^2$ represents an alkyl group having 1 to 4 carbon atoms; i represents an integer of 1 to 3; j represents an integer of 2 to 3.

More specific examples of the alkoxyalcholates are methoxyethylate, methoxypropylate, methoxybutylate, ethoxyethylate, ethoxypropylate, propoxyethylate, and butoxyethylate.

The mixed alkoxide solution can be prepared, for example, by adding alkoxides of the respective elements to an organic solvent so as to establish the above-mentioned stoichiometric ratio and mixing them with stirring.

The organic solvent is not specifically limited, as long as it can dissolve the alkoxides of the respective elements. Examples of such organic solvents are aromatic hydrocarbons, aliphatic hydrocarbons, alcohols, ketones, and esters, of which aromatic hydrocarbons such as benzene, toluene, and xylenes are preferred.

The mixed alkoxide solution is precipitated by adding to it an aqueous solution containing salts of noble metals including Pd in the above-mentioned stoichiometric ratio. Examples of the aqueous solution containing salts of noble metals including Pd are aqueous nitrate solutions, aqueous chloride solutions, aqueous hexaammine chloride solutions, aqueous dinitrodiammine nitrate solutions, aqueous hexachloro acid hydrate, and potassium cyamide salt.

The resulting precipitate is dried by vacuum drying or forced-air drying and then subjected to a heat treatment by heating at about 500° C. to 1000° C., for example, and preferably about 500° C. to 850° C. to obtain a perovskite-type composite oxide.

Alternatively, the perovskite-type composite oxide may be prepared according to the alkoxide process, for example, in the following manner. The mixed alkoxide solution is mixed with a solution containing organometallic salts (materials) of noble metals including Pd to prepare homogeneous mixed solution. The resulting solution is precipitated on hydrolysis by adding water to obtain a precipitation. The precipitation is dried and subjected to a heat treatment thereby to obtain the perovskite-type composite oxide.

Examples of the organometallic salts of noble metals including Pd are carboxylic acid salts of the noble metals including Pd, such as acetates and propionates; and metal chelate complexes of noble metals including Pd, such as diketone complexes of noble metals including Pd represented by the following general formula (4) or (5):

$$R^3COCHR^5COR^4 \quad (4)$$

wherein $R^3$ represents an alkyl group having 1 to 4 carbon atoms, a fluoroalkyl group having 1 to 4 carbon atoms, or an aryl group; $R^4$ represents an alkyl group having 1 to 4 carbon atoms, a fluoroalkyl group having 1 to 4 carbon atoms, an aryl group, or an alkyloxy group having 1 to 4 carbon atoms; and $R^5$ represents a hydrogen atom or an alkyl group having 1 to 4 carbon atoms, $$CH_3CH(COR^6)_2 \quad (5)$$

wherein $R^6$ represents a hydrogen atom or an alkyl group having 1 to 4 carbon atoms.

In the general formulas (4) and (5), the alkyl groups having 1 to 4 carbon atoms in $R^3$, $R^4$, $R^5$ and $R^6$ include methyl, ethyl, propyl, isopropyl, n-butyl, s-butyl, and t-butyl. The fluoroalkyl groups having 1 to 4 carbon atoms in $R^3$ and $R^4$ include trifluoromethyl. The aryl groups in $R^3$ and $R^4$ include phenyl. The alkyloxy group having 1 to 4 carbon atoms in $R^3$ includes methoxy, ethoxy, propoxy, isopropoxy, n-butoxy, s-butoxy, and t-butoxy.

Specific examples of the diketone compounds are 2,4-pentanedione, 2,4-hexanedione, 2,2-dimethyl-3,5-hexanedione, 1-phenyl-1,3-butanedione, 1-trifluoromethyl-1,3-butanedione, hexafluoroacetylacetone, 1,3-diphenyl-1,3-propanedione, dipivaloylmethane, methyl acetoacetate, ethyl acetoacetate, and t-butyl acetoacetate.

The solution containing the organometallic salts of noble metals including Pd can be prepared, for example, by adding organometallic salts of noble metals including Pd to an organic solvent so as to establish the above-mentioned stoichiometric ratio and mixing them with stirring. The organic solvent can be the same organic solvents as listed above.

The resulting solution containing the organometallic salts of noble metals including Pd is combined with the above-mentioned mixed alkoxide solution to prepare a homogeneous mixed solution, which is precipitated by adding water. The resulting precipitate is dried, for example, by vacuum drying or forced-air drying, and then heat-treated at about 400° C. to 1000° C., for example, preferably at about 500° C. to 850° C. to obtain a perovskite-type composite oxide.

Alternatively, the perovskite-type composite oxide of the present invention can be prepared in the following manner. Initially, a perovskite-type composite oxide is prepared from elements other than noble metals including Pd by the above-mentioned coprecipitation process, citrate complex process, or alkoxide process so as to establish the above-mentioned stoichiometric ratio. Then, the resulting perovskite-type composite oxide is supported by noble metals including Pd in the above-mentioned stoichiometric ratio.

The method for supporting the perovskite-type composite oxide by noble metals including Pd is not specifically limited and a known method can be used. For example, a solution containing salts of noble metals including Pd is prepared and the perovskite-type composite oxide is impregnated with the salt-containing solution and then baked.

Solutions containing the above-listed salts can be used as the salt-containing solution. Practical examples thereof are aqueous nitrate solutions, aqueous dinitrodiammine nitrate solutions, and aqueous chloride solutions.

More specific examples are palladium salt solutions such as aqueous palladium nitrate solution, dinitrodiammine palladium nitrate solution, and palladium tetraammine nitrate solution. After being impregnated with the noble metal, the perovskite-type composite oxide is dried at, for example, 50° C. to 200° C. for 1 to 48 hours and then further baked at 350° C. to 1000° C. for 1 to 12 hours.

When the perovskite-type composite oxide is thus produced, since a material is formulated so that the atomic ratio of the elements to be coordinated on the A site exceeds 1, the atomic ratio of the elements to be coordinated on the A site exceeds 1 in the resulting perovskite-type composite oxide of the present invention.

Therefore, according to the production method of the perovskite-type composite oxide of the present invention, it is possible to form a solid solution of Pd stably at a high rate and at the same time to stably produce such a perovskite-type composite oxide in which a solid solution of Pd is formed at a high rate.

According to the production method of the perovskite-type composite oxide of the present invention, even when a material containing the constituent element on the site A is lost during the production, the material is formulated so that the atomic ratio of the elements to be coordinated on the A site exceeds 1, it is possible to suppress that the atomic ratio on the A sire is smaller than the atomic ratio on the B site. Therefore, it is possible to stably produce a perovskite-type composite oxide in which a solid solution of Pd is formed stably at a high rate.

With respect to the resulting perovskite-type composite oxide of the present invention, it is possible to provide a perovskite-type composite oxide which has stable quality in which a solid solution of Pd is formed at a high rate.

The perovskite-type composite oxide of the present invention can be used in various industrial fields without specific limitation. Particularly, the perovskite-type composite oxide of the present invention can be advantageously used as a catalyst composition because Pd has excellent catalytic activity and self-regenerative function.

When the perovskite-type composite oxide of the present invention is used as a catalyst composition, it may be appropriately used as it is or used together with other components according to object and purpose thereof. Applications are not specifically limited and the perovskite-type composite oxide can be widely used in the field where Pd is used as a catalyst. Examples thereof include a coupling reaction catalyst for organic synthesis, a reductive reaction catalyst, a hydrogenation catalyst, a hydrogenolysis catalyst, or an exhaust gas purifying catalyst for internal combustion engines.

Particularly, when used as the exhaust gas purifying catalyst for internal combustion engines, excellent catalytic activity can be maintained for a long period through a self-regenerative function of Pd and thus excellent exhaust gas purifying performances can be realized. Examples of the exhaust gas purifying catalyst for internal combustion engines include automobile exhaust gas purifying catalyst.

When the perovskite-type composite oxide of the present invention is used as the exhaust gas purifying catalyst, it is usually formed into an appropriate form by a known method, for example, for supporting on a catalyst carrier.

The catalyst carrier includes, for example, known catalyst carriers such as honeycomb monolithic carrier made of such as cordierite.

To support the perovskite-type composite oxide of the present invention on the catalyst carrier, water is added to the perovskite-type composite oxide of the present invention to obtain a slurry, which is then coated onto the catalyst carrier, dried and further heat-treated at about 300° C. to 800° C., preferably about 300° C. to 600° C.

In case of preparing such an exhaust gas purifying catalyst, other known catalyst components (for example, alumina supporting the noble metal, and other known complex oxides supporting the noble metal) can be appropriately used in combination with the complex oxide of the present invention.

EXAMPLES

The present invention will be illustrated in further detail by way of the following Examples and Comparative Examples which by no means limit the scope of the present invention.

In the following Examples and Comparative Examples, the same operation was repeated three times and the same kind of triple doses of powders were prepared and then subjected to the measurement of a rate of solid solution described hereinafter. In the following Synthesis Examples by Suzuki Coupling and evaluation of exhaust gas purifying performances, the triple doses of powders prepared in Examples 1 to 2 and Comparative Examples 1 to 2 were used.

1) Production Example of Perovskite-Type Composite Oxide

Example 1

| Lanthanum n-butoxide | 36.5 g (0.102 mol) |
| Iron n-butoxide | 26.1 g (0.095 mol) |

A mixed alkoxide solution was prepared by charging the above components in a 500 mL round-bottomed flask, and dissolving them in 200 mL of toluene with stirring. Then, 1.52 g (0.005 mol) of palladium acetylacetonate was dissolved in 100 mL of toluene and the resulting solution was added to the mixed alkoxide solution in the round-bottomed flask to prepare a uniform mixed solution containing LaFePd.

In the round-bottomed flask, 200 mL of deionized water was added dropwise over about 15 minutes. As a result, a brown viscous precipitate was obtained through hydrolysis.

After stirring at room temperature for 2 hours, toluene and water were distilled off under reduced pressure to obtain a precursor of the LaFePd composite oxide. The precursor was placed on a petri dish, subjected to forced-air drying at 60° C. for 24 hours, then subjected to heat treatment at 800° C. in the atmosphere for one hour using an electric furnace to obtain a blackish brown powder.

In the first operation for preparation of this powder, X-ray diffraction analysis of the powder was conducted. As a result, it was identified as a single crystal phase made of a composite oxide having a perovskite structure of $La_{1.02}Fe_{0.95}Pd_{0.05}O_{3+\delta}$. The powder was found to have a specific surface area of 14 $m^2$/g and a Pd content in the composite oxide of 2.15% by mass.

Example 2

| Lanthanum ethoxyethylate | 42.7 g (0.105 mol) |
| Iron ethoxyethylate | 18.4 g (0.057 mol) |
| Cobalt ethoxyethylate | 9.0 g (0.038 mol) |

A mixed alkoxide solution was prepared by charging the above components in a 500 mL round-bottomed flask, and dissolving them in 200 mL of toluene with stirring. Then, 1.52 g (0.005 mol) of palladium acetylacetonate was dissolved in 100 mL of toluene and the resulting solution was added to the mixed alkoxide solution in the round-bottomed flask to prepare a uniform mixed solution containing LaFeCoPd.

Subsequently, a blackish brown powder was obtained by the same procedure of Example 1.

In the first operation for preparation of this powder, X-ray powder diffraction analysis of the powder was conducted. As a result, it was identified as a single crystal phase made of a composite oxide having a perovskite structure of $La_{1.05}Fe_{0.57}Co_{0.38}Pd_{0.05}O_{3+\delta}$. The powder was found to have a specific surface area of 11 $m^2$/g and a Pd content in the composite oxide of 2.10% by mass."

Example 3

| Lanthanum methoxyethylate | 32.8 g (0.090 mol) |
| Neodymium methoxyethylate | 7.4 g (0.020 mol) |
| Iron methoxyethylate | 25.3 g (0.090 mol) |

A mixed alkoxide solution was prepared by charging the above components in a 500 mL round-bottomed flask, and dissolving them in 200 mL of toluene with stirring. Then, 3.05 g (0.010 mol) of palladium acetylacetonate was dissolved in 100 mL of toluene and the resulting solution was added to the mixed alkoxide solution in the round-bottomed flask to prepare a uniform mixed solution containing LaNdFePd.

Subsequently, a blackish brown powder was obtained by the procedure of Example 1.

In the first operation for preparation of this powder, X-ray powder diffraction analysis of the powder was conducted. As a result, it was identified as a single crystal phase made of a composite oxide having a perovskite structure of $La_{0.90}Nd_{0.20}Fe_{0.90}Pd_{0.10}O_{3+\delta}$. The powder was found to have a specific surface area of 29 $m^2$/g and a Pd content in the composite oxide of 4.05% by mass.

Example 4

| Neodymium nitrate | 40.3 g (0.092 mol) |
| Yttrium nitrate | 3.8 g (0.010 mol) |
| Iron nitrate | 38.4 g (0.095 mol) |

Aqueous palladium nitrate solution (Pd content of 4.399% by mass) 12.1 g (0.53 g in terms of Pd, corresponding to 0.005 mol)

The above listed components were dissolved in 100 mL of pure water and mixed homogeneously to obtain an aqueous mixed salt solution containing NdYFePd. Next, 50.4 g (0.24 mol) of citric acid was dissolved in pure water and the resulting solution was added to the aqueous mixed salt solution to prepare an aqueous citrate mixed salt solution containing NdYFePd.

Next, the aqueous citrate mixed salt solution was evaporated to dryness in an oil bath at 60° C. to 80° C. while being evacuated with a rotary evaporator. At the time when the solution became viscous syrup after about 3 hours, the temperature of the oil bath was gradually raised, followed by vacuum drying at 250° C. for one hour, thereby to obtain a citrate complex.

The citrate complex was baked at 300° C. in the air for 3 hours, crushed in a mortar and baked again at 700° C. in the air for 3 hours to obtain a powder.

In the first operation for preparation of this powder, X-ray powder diffraction analysis of the powder was conducted. As a result, it was identified as a single crystal phase made of a composite oxide having a perovskite structure of $Nd_{0.92}Y_{0.10}Fe_{0.95}Pd_{0.05}O_{3+\delta}$. The powder was found to have a specific surface area of 28.1 m$^2$/g and a Pd content in the composite oxide of 2.15% by mass.

Example 5

| | |
|---|---|
| Lanthanum nitrate | 43.3 g (0.100 mol) |
| Strontium nitrate | 5.7 g (0.020 mol) |
| Manganese nitrate | 23.0 g (0.080 mol) |
| Aluminum nitrate | 5.6 g (0.015 mol) |

Aqueous palladium nitrate solution (Pd content of 4.399% by mass) 12.1 g (0.53 g in terms of Pd, corresponding to 0.005 mol)

The above listed components were dissolved in 200 mL of ion-exchange water and mixed homogeneously to obtain an aqueous mixed salt solution containing LaSrMnAlPd.

To the resulting solution, an aqueous ammonium carbonate solution as a neutralizing agent was added dropwise so as to adjust the pH to 10 thereby to form a precipitate, then well stirred and further subjected to filtration and washing.

The resulting coprecipitate was dried at 120° C. for 12 hours and baked at 700° C. in the air for 3 hours to obtain a powder.

In the first operation for preparation of this powder, X-ray powder diffraction analysis of the powder was conducted. As a result, it was identified as a single crystal phase made of a composite oxide having a perovskite structure of $La_{1.00}Sr_{0.20}Mn_{0.80}Al_{0.15}Pd_{0.05}O_{3+\delta}$. The powder was found to have a specific surface area of 16.1 m$^2$/g and a Pd content in the composite oxide of 2.06% by mass.

Example 6

| | |
|---|---|
| Lanthanum methoxypropylate | 41.4 g (0.102 mol) |
| Iron methoxypropylate | 25.9 g (0.080 mol) |
| Manganese methoxypropylate | 2.3 g (0.010 mol) |

A mixed alkoxide solution was prepared by charging the above components in a 500 mL round-bottomed flask, and dissolving them in 200 mL of toluene with stirring. Then, 3.05 g (0.010 mol) of palladium acetylacetonate was dissolved in 100 mL of toluene and the resulting solution was added to the mixed alkoxide solution in the round-bottomed flask to prepare a uniform mixed solution containing LaFeMnPd.

Subsequently, a blackish brown powder was prepared by the same procedure of Example 1.

In the first operation for preparation of this powder, X-ray powder diffraction analysis of the powder was conducted. As a result, it was identified as a single crystal phase made of a composite oxide having a perovskite structure of $La_{1.02}Fe_{0.80}Mn_{0.10}Pd_{0.10}O_{3+\delta}$. The powder was found to have a specific surface area of 24.8 m$^2$/g and a Pd content in the composite oxide of 4.25% by mass.

Example 7

| | |
|---|---|
| Lanthanum ethoxyethylate | 41.4 g (0.102 mol) |
| Cerium ethoxyethylate | 2.0 g (0.005 mol) |
| Iron ethoxyethylate | 18.4 g (0.057 mol) |
| Cobalt ethoxyethylate | 9.0 g (0.038 mol) |

A mixed alkoxide solution was prepared by charging the above components in a 500 mL round-bottomed flask, and dissolving them in 200 mL of toluene with stirring. Then, 1.52 g (0.005 mol) of palladium acetylacetonate was dissolved in 100 mL of toluene and the resulting solution was added to the mixed alkoxide solution in the round-bottomed flask to prepare a uniform mixed solution containing LaCeFeCoPd.

Subsequently, a blackish brown powder was prepared by the procedure of Example 1.

In the first operation for preparation of this powder, X-ray powder diffraction analysis of the powder was conducted. As a result, it was identified as a single crystal phase made of a composite oxide having a perovskite structure of $La_{1.02}Ce_{0.05}Fe_{0.57}Co_{0.38}Pd_{0.05}O_{3+\delta}$. The powder was found to have a specific surface area of 25.2 m$^2$/g and a Pd content in the composite oxide of 2.08% by mass.

Example 8

| | |
|---|---|
| Lanthanum nitrate | 45.5 g (0.105 mol) |
| Cobalt nitrate | 22.5 g (0.095 mol) |

Aqueous palladium nitrate solution (Pd content of 4.399% by mass) 12.1 g (0.53 g in terms of Pd, corresponding to 0.005 mol)

A mixed salt solution containing LaFeCoPd was prepared by dissolving and mixing homogeneously the above components in 200 mL of ion-exchange water. Subsequently, a powder was prepared by the same procedure of Example 5.

In the first operation for preparation of this powder, X-ray powder diffraction analysis of the powder was conducted. As a result, it was identified as a single crystal phase made of a composite oxide having a perovskite structure of $La_{1.05}Co_{0.95}Pd_{0.05}O_{3+\delta}$. The powder was found to have a specific surface area of 23.4 m$^2$/g and a Pd content in the composite oxide of 2.09% by mass.

Example 9

| | |
|---|---|
| Lanthanum i-propoxide | 30.0 g (0.095 mol) |
| Calcium i-propoxide | 1.6 g (0.010 mol) |
| Aluminum i-propoxide | 19.4 g (0.095 mol) |

A mixed alkoxide solution was prepared by charging the above components in a 500 mL round-bottomed flask, and dissolving them in 200 mL of toluene with stirring. Then, 1.52 g (0.005 mol) of palladium acetylacetonate was dissolved in 100 mL of toluene and the resulting solution was added to the mixed alkoxide solution in the round-bottomed flask to prepare a uniform mixed solution containing LaCaAlPd.

Subsequently, a blackish brown powder was prepared by the same procedure of Example 1.

In the first operation for preparation of this powder, X-ray powder diffraction analysis of the powder was conducted. As a result, it was identified as a single crystal phase made of a composite oxide having a perovskite structure of $La_{0.95}Ca_{0.10}Al_{0.95}Pd_{0.05}O_{3+\delta}$. The powder was found to have a specific surface area of 10.2 m$^2$/g and a Pd content in the composite oxide of 2.48% by mass.

Example 10

| Lanthanum methoxypropylate | 44.7 g (0.110 mol) |
|---|---|
| Manganese methoxypropylate | 22.2 g (0.095 mol) |

A mixed alkoxide solution was prepared by charging the above components in a 500 mL round-bottomed flask, and dissolving them in 200 mL of toluene with stirring.

Subsequently, a blackish brown powder was obtained by the same procedure of Example 1. Using 4.27 g (0.42 g in terms of Pd) of an aqueous palladium nitrate solution (Pd content of 9.83% by mass), 20 g of this powder was impregnated with Pd, subjected to forced-air drying at 60° C. for 24 hours, crushed and then subjected to heat treatment at 500° C. in the air for one hour using an electric furnace to obtain a powder.

In the first operation for preparation of this powder, X-ray powder diffraction analysis of the powder was conducted. As a result, it was identified as a single crystal phase made of a composite oxide having a perovskite structure of $La_{1.10}Mn_{0.95}Pd_{0.05}O_{3+\delta}$. The powder was found to have a specific surface area of 25.1 m$^2$/g and a Pd content in the composite oxide of 2.06% by mass.

Example 11

| Lanthanum n-butoxide | 46.6 g (0.130 mol) |
|---|---|
| Iron n-butoxide | 26.1 g (0.095 mol) |

A mixed alkoxide solution was prepared by charging the above components in a 500 mL round-bottomed flask, and dissolving them in 200 mL of toluene with stirring. Then, 1.52 g (0.005 mol) of palladium acetylacetonate was dissolved in 100 mL of toluene and the resulting solution was added to the mixed alkoxide solution in the round-bottomed flask to prepare a uniform mixed solution containing LaFePd.

Subsequently, a blackish brown powder was obtained by the procedure of Example 1.

In the first operation for preparation of this powder, X-ray powder diffraction analysis of the powder was conducted. As a result, it was identified as a composite oxide having a perovskite structure of $La_{1.30}Fe_{0.95}Pd_{0.05}O_{3+\delta}$ as a main component and partially having $La_2O_3$. The powder was found to have a specific surface area of 6.2 m$^2$/g and a Pd content in the composite oxide of 1.81% by mass.

Comparative Example 1

| Lanthanum ethoxyethylate | 40.6 g (0.100 mol) |
|---|---|
| Iron ethoxyethylate | 30.7 g (0.095 mol) |

A mixed alkoxide solution was prepared by charging the above components in a 500 mL round-bottomed flask, and dissolving them in 200 mL of toluene with stirring. Then, 1.52 g (0.005 mol) of palladium acetylacetonate was dissolved in 100 mL of toluene and the resulting solution was added to the mixed alkoxide solution in the round-bottomed flask to prepare a uniform mixed solution containing LaFePd.

Subsequently, a blackish brown powder was obtained by the procedure of Example 1.

In the first operation for preparation of this powder, X-ray powder diffraction analysis of the powder was conducted. As a result, it was identified as a single crystal phase made of a composite oxide having a perovskite structure of $La_{1.00}Fe_{0.95}Pd_{0.05}O_3$. The powder was found to have a specific surface area of 23.8 m$^2$/g and a Pd content in the composite oxide of 2.17% by mass.

Comparative Example 2

| Lanthanum nitrate | 43.3 g (0.100 mol) |
|---|---|
| Iron nitrate | 23.0 g (0.057 mol) |
| Cobalt nitrate | 9.0 g (0.038 mol) |

Aqueous palladium nitrate solution (Pd content of 4.399% by mass) 12.1 g (0.53 g in terms of Pd, corresponding to 0.005 mol)

A mixed salt solution containing LaFeCoPd was prepared by dissolving and mixing homogeneously the above components in 200 mL of ion-exchange water. Subsequently, a powder was obtained by the same procedure of Example 5.

In the first operation for preparation of this powder, X-ray powder diffraction analysis of the powder was conducted. As a result, it was identified as a single crystal phase made of a composite oxide having a perovskite structure of $La_{1.00}Fe_{0.57}Co_{0.38}Pd_{0.05}O_3$. The powder was found to have a specific surface area of 11.8 m$^2$/g and a Pd content in the composite oxide of 2.16% by mass.

2) Measurement of Rate of Solid Solution

Each of the triple doses of the powders obtained in respective Examples and Comparative Examples was dissolved in an aqueous 7 wt % hydrochloric acid solution and allowed to stand at room temperature for 20 hours, and then each solution was filtered through a filter having a pore size of 0.1 μmφ.

An amount of Pd dissolved in the resulting filtrate was determined by inductively coupled plasma (ICP) atomic emission spectroscopy and quantitative analysis of Pd in the residue was carried out by the X-ray diffraction (XRD)-scanning electron microscopy (SEM) analytical method. The amount of solid solution of Pd was calculated from these results. The results are shown in Table 1.

In the above method, the residue was produced during dissolving the respective powders in an aqueous 7 wt % hydrochloric acid solution. However, since Pd constituting a solid solution in a perovskite-type crystal structure was dissolved, a proportion of Pd constituting a solid solution in a perovskite-type crystal structure could be determined by measuring a concentration of Pd in the solution.

excessive fuel to react with the secondary air in the interior of the exhaust gas purifying catalysts, so as to raise the temperature. In this time period, the air fuel ratio of the exhaust gas in the exhaust gas purifying catalysts was in a somewhat lean state than the stoichiometric state (A/F=14.8), and the highest temperature in the catalyst bed reached 1000° C. From 28 to 30 seconds (for 2 seconds), the secondary air was fed to the

TABLE 1

| | Catalyst | Preparation process | Pd content (% by mass) | Total atomic ratio of A site | Rate of solid solution of Pd (%) First time | Second time | Third time |
|---|---|---|---|---|---|---|---|
| Example 1 | $La_{1.02}Fe_{0.95}Pd_{0.05}O_{3+\sigma}$ | Alkoxide | 2.15 | 1.02 | 93 | 92 | 96 |
| Example 2 | $La_{1.05}Fe_{0.57}Co_{0.38}Pd_{0.05}O_{3+\sigma}$ | Alkoxide | 2.10 | 1.05 | 92 | 90 | 91 |
| Example 3 | $La_{0.90}Nd_{0.20}Fe_{0.90}Pd_{0.10}O_{3+\sigma}$ | Alkoxide | 4.05 | 1.10 | 89 | 92 | 87 |
| Example 4 | $Nd_{0.92}Y_{0.10}Fe_{0.95}Pd_{0.05}O_{3+\sigma}$ | Citrate complex | 2.15 | 1.02 | 85 | 86 | 83 |
| Example 5 | $La_{1.00}Sr_{0.20}Mn_{0.80}Al_{0.15}Pd_{0.05}O_{3+\sigma}$ | Coprecipitation | 2.06 | 1.20 | 84 | 82 | 81 |
| Example 6 | $La_{1.02}Fe_{0.80}Mn_{0.10}Pd_{0.10}O_{3+\sigma}$ | Alkoxide | 4.25 | 1.02 | 92 | 90 | 91 |
| Example 7 | $La_{1.02}Ce_{0.05}Fe_{0.57}Co_{0.38}Pd_{0.05}O_{3+\sigma}$ | Alkoxide | 2.08 | 1.07 | 85 | 83 | 84 |
| Example 8 | $La_{1.05}Co_{0.95}Pd_{0.05}O_{3+\sigma}$ | Coprecipitation | 2.09 | 1.05 | 84 | 86 | 86 |
| Example 9 | $La_{0.95}Ca_{0.10}Al_{0.95}Pd_{0.05}O_{3+\sigma}$ | Alkoxide | 2.48 | 1.05 | 89 | 91 | 91 |
| Example 10 | $La_{1.10}Mn_{0.95}Pd_{0.05}O_{3+\sigma}$ | Alkoxide/Post-supporting | 2.06 | 1.10 | 84 | 83 | 80 |
| Example 11 | $La_{1.30}Fe_{0.95}Pd_{0.05}O_{3+\sigma}$ | Alkoxide | 1.81 | 1.30 | 97 | 96 | 99 |
| Comparative Example 1 | $La_{1.00}Fe_{0.95}Pd_{0.05}O_3$ | Alkoxide | 2.17 | 1.00 | 95 | 67 | 43 |
| Comparative Example 2 | $La_{1.00}Fe_{0.57}Co_{0.38}Pd_{0.05}O_3$ | Coprecipitation | 2.16 | 1.00 | 85 | 37 | 59 |

3) Evaluation of Exhaust Gas Purifying Performances 3-1) Production of Exhaust Gas Purifying Catalyst Test piece: Each of the Pd-containing perovskite-type composite oxides obtained in Examples 1 to 2 and Comparative Examples 1 to 2 was supported on a honeycomb having a diameter of 30 mm, a length of 50 mm and a size of 6 mil per 400 cells so that Pd per 1 L of the exhaust gas purifying catalyst is 3.2 g.

3-2) Durability Test

Each of the exhaust gas purifying catalysts of Examples 1 to 2 and Comparative Examples 1 to 2 thus obtained was connected to a bank of a V-type eight-cylinder gasoline engine of 4 L. With a cycle of 30 seconds in which the highest temperature in the catalyst bed was 1000° C., the cycle was repeated for 40 hours for endurance test. Then, annealing was carried out at an air-fuel ratio A/F of 14.3 and at 900° C. for 2 hours.

One cycle was set as follows. From 0 to 5 seconds (for 5 seconds), a mixed gas which was kept of amount of theoretical air fuel ratio (A/F=14.6, in the stoichiometric state) under feedback control was fed to the engine and the internal temperature of the exhaust gas purifying catalysts was set at around 850° C. From 5 to 28 seconds (for 23 seconds), feedback control was cancelled and the operation was conducted while injecting the fuel excessively. From 5 to 7 seconds (for 2 seconds) among the above time period, the fuel was injected excessively and the fuel rich mixed gas (A/F=11.2) was fed to the engine, and then an exhaust gas (the same air fuel ratio A/F=11.2) was introduced into the catalyst. From 7 to 28 seconds (for 21 seconds), while an excessive amount of fuel was kept on being fed to the engine, secondary air was introduced from the outside of the engine through an inlet tube in upstream of the exhaust gas purifying catalysts, to cause the exhaust gas purifying catalysts under feedback control from upstream of the catalysts again thereby to put the exhaust gas into a lean state.

The temperatures of the exhaust gas purifying catalysts were measured with a thermocouple inserted into a center part of the honeycomb carrier. A phosphorus compound was added to the fuel (gasoline) so that phosphorus element in the exhaust gas poisons the catalysts. The amount of the phosphorus compound was set so that 50 mg in terms of phosphorus element was attached to the exhaust gas purifying catalysts during the endurance time of 40 hours.

Furthermore, 10 test pieces were put in a cylindrical converter and then subjected to an endurance treatment.

3-3) Measurement of 50% Purifying Temperature

While varying a rich gas and a lean gas every one second and raising the temperature of this variation model gas at a rate of 20° C./minute, the variation model gas was fed to the exhaust gas purifying catalysts of Examples 1 and 2 and Comparative Examples 1 and 2 after an endurance test, and the temperature at which 50% of HC, CO and NOx in the exhaust gas were purified was measured as the 50% purifying temperature. The results are shown in Table 2.

Space velocity (SV) was set at 35000/h and the A/F was set at 14.6±0.5 (0.5 Hz).

Compositions of the rich gas and the lean gas are as follows.

| | CO | $H_2$ | $C_3H_6$ | $C_3H_8$ | $O_2$ | NOx | $CO_2$ |
|---|---|---|---|---|---|---|---|
| Rich gas | 22000 | 7333 | 500 | 133 | 6700 | 1700 | 80000 |
| Lean gas | 7000 | 2333 | 500 | 133 | 16700 | 1700 | 80000 |

(Unit: ppm)

TABLE 2

| Catalyst | Preparation | | 50% Purifying temperature (° C.) | | |
|---|---|---|---|---|---|
| | Number of repetition | Rate of solid solution of Pd (%) | HC | CO | NOx |
| Example 1  $La_{1.02}Fe_{0.95}Pd_{0.05}O_{3+\sigma}$ | First time | 93 | 290 | 277 | 272 |
| | Second time | 92 | 291 | 277 | 274 |
| | Third time | 96 | 289 | 274 | 270 |
| Example 2  $La_{1.05}Fe_{0.57}Co_{0.38}Pd_{0.05}O_{3+\sigma}$ | First time | 92 | 298 | 264 | 271 |
| | Second time | 90 | 299 | 268 | 273 |
| | Third time | 91 | 298 | 264 | 273 |
| Comparative Example 1  $La_{1.00}Fe_{0.95}Pd_{0.05}O_3$ | First time | 95 | 289 | 275 | 271 |
| | Second time | 67 | 321 | 308 | 300 |
| | Third time | 43 | 357 | 331 | 349 |
| Comparative Example 2  $La_{1.00}Fe_{0.57}Co_{0.38}Pd_{0.05}O_3$ | First time | 85 | 309 | 271 | 280 |
| | Second time | 37 | 381 | 307 | 342 |
| | Third time | 59 | 335 | 301 | 306 |

4) Synthesis Example of 4-methoxybiphenyl by Suzuki Coupling

Using triples doses of the powders (Pd-containing perovskite-type composite oxide) obtained in Examples 1 and 2 and Comparative Examples 1 and 2 as a synthetic reaction catalyst, 4-bromoanisole was reacted with phenylboronic acid, as shown in the following scheme (6).

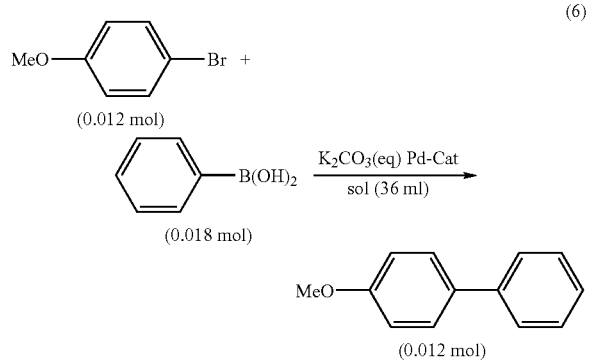

(6)

Synthesis Example

| 4-bromoanisole | 2.24 g (0.012 mol) |
|---|---|
| Phenylboronic acid | 2.19 g (0.018 mol) |
| Potassium carbonate | 4.98 g (0.036 mol) |

A solution was prepared by charging the above components in a 100 mL round-bottomed flask, and dissolving them in each 18 mL of pure water and 2-methoxy-1-propanol as solvents with stirring. To the solution, $6 \times 10^{-5}$ mol ($3 \times 10^{-6}$ mol in terms of Pd, namely, 0.025 mol % in terms of Pd with respect to 4-bromoanisole) of each of the Pd containing perovskite-type composite oxides obtained in Examples 1 and 2 and Comparative Examples 1 and 2 was added, heated using a mantle heater and further heated under reflux at 100° C. for 10 hours.

After the completion of the reaction and cooling, the resulting product was dissolved in 20 mL of toluene and insolubles were removed by suction filtration. Then, the solvent was distilled off thereby to a white solid separated out. After the white solid was dissolved in 20 mL of toluene and 20 mL of pure water, the resulting solution was placed in a separating funnel and a lower layer was separated. Furthermore, the residue washed with 20 mL of pure water and then separated. Then, 5 g of sodium sulfate was added, followed by well shaking and further dehydration and drying. Insolubles were removed by filtration and the solvent was distilled off from the filtrate to obtain the objective 4-methoxybiphenyl as a white crystal. The weight of the white crystal was measured and crude yield was calculated. As a result, it was 102 to 112%. The white solid was then dissolved in 20 mL of toluene with stirring, and then a conversion rate was determined by gas chromatography.

Conversion rate (%)=4-methoxybiphenyl/4-bromoanisole+4-methoxybiphenyl (previously, relative sensitivity was determined by separately measuring toluene solutions of 4-methoxybiphenyl and 4-bromoanisole, and correction was conducted).

These results are shown in Table 3.

TABLE 3

| | | Preparation | | | |
|---|---|---|---|---|---|
| Examples | Catalyst | Preparation process | Number of repetition | Rate of solid solution of Pd (%) | Conversion rate (%) |
| Example 1 | $La_{1.02}Fe_{0.95}Pd_{0.05}O_{3+\sigma}$ | Alkoxide | First time | 93 | 88.3 |
| | | | Second time | 92 | 87.8 |
| | | | Third time | 96 | 91.1 |

TABLE 3-continued

| Examples | Catalyst | Preparation process | Number of repetition | Rate of solid solution of Pd (%) | Conversion rate (%) |
|---|---|---|---|---|---|
| Example 2 | $La_{1.05}Fe_{0.57}Co_{0.38}Pd_{0.05}O_{3+\sigma}$ | Alkoxide | First time | 92 | 90.6 |
| | | | Second time | 90 | 87.1 |
| | | | Third time | 91 | 88.8 |
| Comparative Example 1 | $La_{1.00}Fe_{0.95}Pd_{0.05}O_3$ | Alkoxide | First time | 95 | 87.2 |
| | | | Second time | 67 | 67.5 |
| | | | Third time | 43 | 41.1 |
| Comparative Example 2 | $La_{1.00}Fe_{0.57}Co_{0.38}Pd_{0.05}O_3$ | Coprecipitation | First time | 85 | 80.8 |
| | | | Second time | 37 | 38.1 |
| | | | Third time | 59 | 57.2 |

While the illustrative embodiments and examples of the present invention are provided in the above description, such are for illustrative purpose only and are not to be construed restrictively. Modification and variation of the present invention which will be obvious to those skilled in the art are to be covered in the following claims.

INDUSTRIAL APPLICABILITY

The perovskite-type composite oxide of the present invention can be widely used in the field where Pd is used as a catalyst, and is advantageously used as a coupling reaction catalyst for organic synthesis, a reductive reaction catalyst, a hydrogenation reaction, a hydrogenolysis reaction, or an exhaust gas purifying catalyst for internal combustion engines such as automobile exhaust gas purifying catalyst.

The invention claimed is:

1. A perovskite-type composite oxide represented by the following general formula (1):

$$A_xB_{(1-y)}Pd_yO_{3+\delta} \quad (1)$$

wherein A represents at least one element selected from rare earth elements and alkaline earth metals; B represents at least one element selected from transition elements (excluding rare earth elements, and Pd), Al and Si; x represents an atomic ratio satisfying the following condition: 1.02<x<1.5; y represents an atomic ratio satisfying the following condition: 0<y≦0.5; and δ represents an oxygen excess.

2. A perovskite-type composite oxide represented by the following general formula (2):

$$(A_aA'_bA''_c)(B_{1-(q+r)}B'_qPd_r)O_{3+\delta} \quad (2)$$

wherein A represents at least one element selected from La, Nd and Y; A' represents at least one element selected from rare earth elements and alkaline earth metals (excluding La, Nd, Y, Ce, Pr and Tb); A" represents at least one element selected from Ce, Pr and Tb; B represents at least one element selected from Mn, Fe, Co and AL; B' represents at least one element selected from transition elements (excluding rare earth elements, and Mn, Fe, Go, Al and Pd) and Si;

a represents an atomic ratio satisfying the following condition: 0.5<a≦1.3; b represents an atomic ratio satisfying the following condition: 0≦b<0.5; (a+b) represent atomic ratios satisfying the following condition: 1.02<(a+b)≦1.3; c represents an atomic ratio satisfying the following condition: 0≦c≦0.2; q represents an atomic ratio satisfying the following condition: 0≦q<0.5; r represents an atomic ratio satisfying the following condition: 0<r≦0.5; and δ represents an oxygen excess.

3. The perovskite-type composite oxide according to claim 2, wherein at least one of b, c and q is 0 in the general formula (2).

4. A catalyst composition comprising the perovskite-type composite oxide according to claim 1.

5. The catalyst composition according to claim 4, which is an exhaust gas purifying catalyst.

6. The catalyst composition according to claim 4, which is a coupling reaction catalyst for organic synthesis.

* * * * *